United States Patent [19]

Haist et al.

[11] 4,198,545
[45] Apr. 15, 1980

[54] AUTOMATIC CALL TIMING TELEPHONE APPARATUS

[75] Inventors: Melval C. Haist, Sunrise; Alan J. Lischin, Plantation, both of Fla.

[73] Assignee: Communication Equipment and Engineering Company, Melrose Pk., Ill.

[21] Appl. No.: 884,642

[22] Filed: Mar. 8, 1978

[51] Int. Cl.² .................................... H04M 17/00
[52] U.S. Cl. ................ 179/6.31; 179/6.3 R
[58] Field of Search .......... 179/6.3 R, 6.31, 6.4, 179/6.5, 7.1 R, 18 B, 18 D, 18 DA; 235/92 TE

[56] References Cited

U.S. PATENT DOCUMENTS

| 3,728,490 | 4/1973 | Nowicki | 179/6.3 R |
|---|---|---|---|
| 3,997,726 | 12/1976 | de Crepy | 179/6.4 |
| 4,028,494 | 6/1977 | Zarouni | 179/6.3 R |
| 4,105,867 | 8/1978 | Levasseur et al. | 179/6.3 R |
| 4,122,308 | 10/1978 | Weinberger et al. | 179/6.3 R |

OTHER PUBLICATIONS

*Automatization of Coin Toll Calls and Upgrading the Coin Telephone Service of Single Slot Payitation* 1973, Nat. Telecommunications Conference, vol. I, pp. 100-1 to 100-4.

Primary Examiner—Gerald Brigance

Attorney, Agent, or Firm—Mason, Kolehmainen, Rathburn & Wyss

[57] ABSTRACT

Improved control apparatus for a pay station is provided that automatically determines the applicable tariff rate and the purchased call time as coins are deposited in accordance with the pay station identification and the phone number of the called party. Selective programming is provided by the control apparatus to select a basic time rate period for each of a predetermined number of tariff rates corresponding to calls to various telephone tariff zones. The control apparatus automatically operates the pay station in either a postpay or prepay mode and credits the calling party with a number of basic time rate periods corresponding to the total value of deposited coins and as coins are deposited. The basic time rate period corresponds to a predetermined number of seconds for a specified basic coin value or denomination. Thus, the calling party establishes a purchased time credit equal to the basic time rate period multiplied by the total number of basic coin denominations deposited. The control apparatus also includes automatic call limiting apparatus to mute the audio connection between the calling party and the called party without dropping the line connection if the purchased time credit elapses without the calling party depositing more coins. A warning tone is generated prior to the audio muting and the end of the purchased time period to signal the calling party to deposit more coins.

8 Claims, 5 Drawing Figures

Fig. 1

Fig. 4  COIN TONE/COIN PULSE GENERATOR

AUTOMATIC CALL TIMING TELEPHONE APPARATUS

BACKGROUND OF THE INVENTION

A. Field of the Invention

The present invention relates generally to the field of telephone apparatus and more particularly to control apparatus for a pay station that provides automatic call limiting and timing features.

B. Description of the Prior Art

Pay stations of the prior art are generally capable of informing the operator at the central office as coins are deposited. The operator maintains control of the audio portion and line connection of the call and requests the calling party at the pay station to deposit coins corresponding to an initial time period in accordance with the tariff rates applicable to the individual call. Thus, as coins are deposited, signals are transmitted to the operator. When the initial time period elapses, the operator requests additional coins as required for additional time of the call beyond the initial purchased time. Alternatively, the operator requests additional coins to be deposited at the end of the call for the overtime period.

While the arrangements of the prior art are generally suitable for their intended use, operator assistance is required to insure proper payment and timing of telephone calls.

SUMMARY OF THE INVENTION

It is a principal object of the present invention to provide control apparatus for a pay station telephone wherein the control apparatus automatically determines the tariff rate for a particular call and the required coins to be deposited for establishing and/or maintaining the call.

It is a further object of the present invention to provide control apparatus for a pay station telephone that automatically determines the applicable tariff rate and controls the progress of the call in a prepay and/or postpay fashion; initially deposited coins are totalled and credited to establish a predetermined purchased call time credit and additional time may be purchased by the calling party either prior to or after the end of the purchased time period.

Briefly, in accordance with one important aspect of the present invention there is provided improved control apparatus for a pay station that automatically determines the applicable tariff rate and the purchased call time as coins are deposited in accordance with the pay station identification and the phone number of the called party. Selective programming is provided by the control apparatus to select a basic time rate period for each of a predetermined number of tariff rates corresponding to calls to various telephone tariff zones. The control apparatus automatically operates the pay station in either a postpay or prepay mode and credits the calling party with a number of basic time rate periods corresponding to the total value of deposited coins and as coins are deposited. The basic time rate period corresponds to a predetermined number of seconds for a specified basic coin value or denomination. Thus, the calling party establishes a purchased time credit equal to the basic time rate period multiplied by the total number of basic coin denominations deposited. The control apparatus also includes automatic call limiting apparatus to mute the audio connection between the calling party and the called party without dropping the line connection if the purchased time credit elapses without the calling party depositing more coins. A warning tone is generated prior to the audio muting and the end of the purchased time period to signal the calling party to deposit more coins.

The invention both as to its organization and method of operation together with further objects and advantages thereof will best be understood by reference to the following specification taken in connection with the accompanying drawings.

DESCRIPTION OF THE PREFERRED EMBODIMENT

Figure 1:
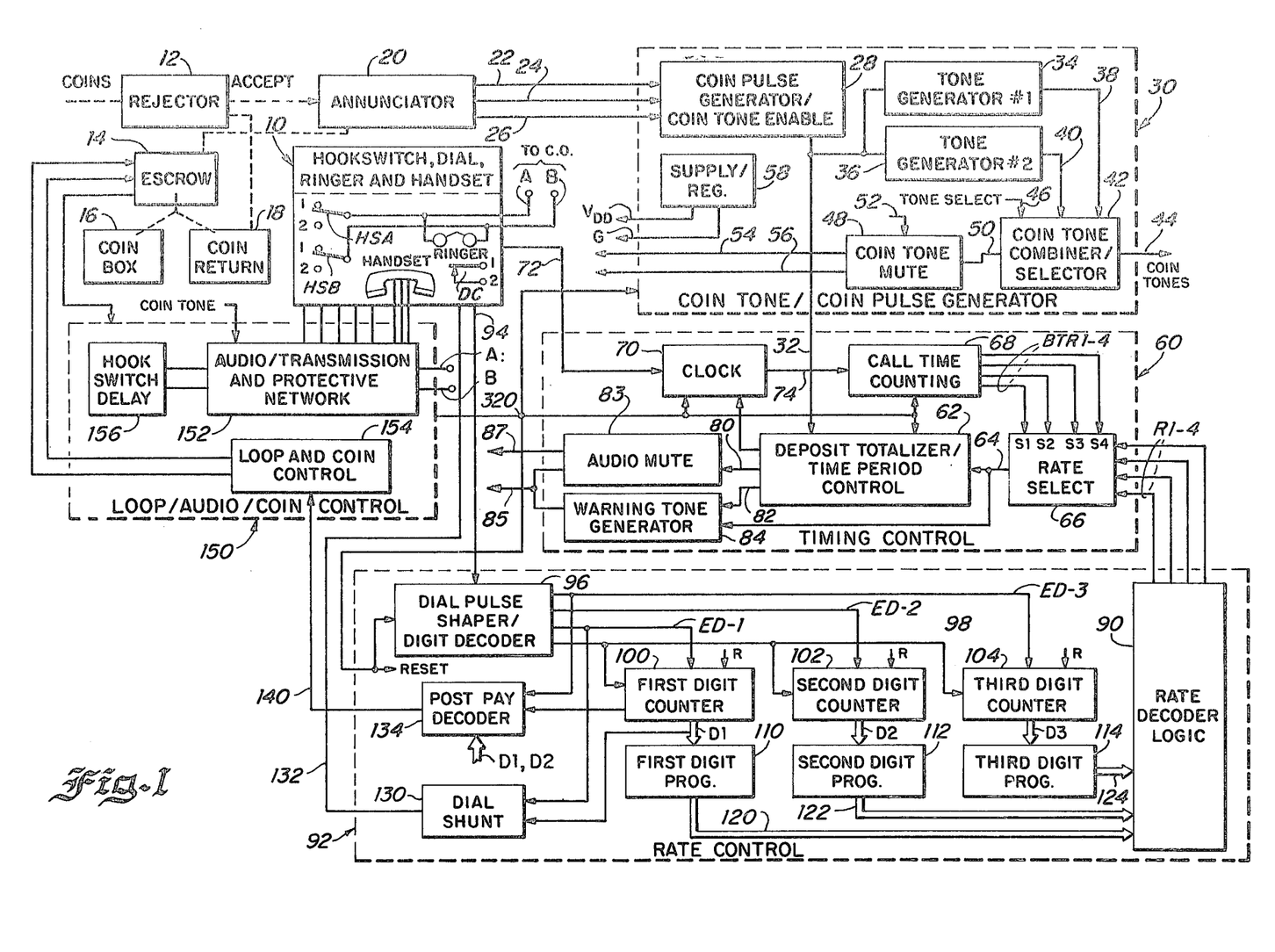
FIG. 1 is a block diagram schematic representation of the control apparatus of the present invention.

Referring now to FIG. 1, the control apparatus of the present invention is shown in connection with the control of a telephone pay station. The pay station includes a handset, dial contacts DC-1 and DC-2, a ringer and a hookswitch having two contact pairs HSA-1, 2 and HSB-1, 2; all referred to generally at 10 and as further described in copending application Ser. No. 833,511 filed by R. A. Clark, Jr. on Sept. 15, 1977.

The pay station also includes a rejector arrangement referred to generally at 12 for sorting and testing deposited coins that are delivered into the rejector from a coin slot. All the coins enter through a common chute. In a specific embodiment, the coins exit from one of four chutes corresponding to valid 25 cent coins, valid 10 cent coins, valid 5 cent coins and any other introduced and rejected element. All the valid coins exiting from the three accepted coin chutes are delivered to an escrow unit 14 where they are held for subsequent release into either a coin collection box 16 or a coin return device 18.

An annunciator arrangement referred to generally at 20 provides electrical impulses on lines 22, 24 and 26 to identify the quantity and denomination of coins that are accepted and passed by the rejector 12. The lines 22, 24 and 26 correspond to deposited and accepted 5 cent, 10 cent and 25 cent coins. While a specific monetary system and coin denominations are described, it should be realized that the present invention contemplates various other deposit systems.

The indication of the deposited coins on lines 22, 24 and 26 are connected to a coin pulse generator and coin tone enable stage 28 of the coin tone/coin pulse generator apparatus of the present invention referred to generally at 30. The coin pulse generator and coin tone enable stage 28 is effective to generate a number of coin pulses at an output 32 representing the total of deposited coins.

In one arrangement, one pulse is generated at 32 for a 5 cent coin, two pulses for a 10 cent coin and five pulses for a 25 cent coin. Thus, a coin pulse is generated for each 5 cent denomination deposit.

The coin pulse output 32 is also connected to enable a first tone generator stage 34 and a second tone generator stage 36. The tone generators 34 and 36 are each arranged to produce a predetermined tone signal frequency at a respective output 38, 40 for a pulse duration defined by the coin pulse signal at 32. The respective outputs 38 and 40 of the tone generators 34 and 36 are connected to a coin tone combiner/selector stage 42 that selectively combines the tone generator outputs 38 and 40 to output either a single frequency or dual frequency coin tone at output 44 in accordance with the state of a tone select control lead 46. Thus, the tone generators 34 and 36 are enabled to each produce a tone burst of respective predetermined frequencies for a predetermined interval of time dependent upon the duration of each of the coin pulse signals at 32.

The coin tone output 44 is connected through the control circuitry of the present invention onto the telephone line pair to the central office. At the central office, the coin tones are utilized by an operator to identify deposited coins in those situations where an operator is required; e.g. international long distance calls, collect calls and the like. The coin telephone combiner/selector stage 42 also controls a coin tone mute stage 48 over a control line 50. The coin tone mute stage 48 selectively mutes the loop audio path to the handset under the control of a mute mode select line 52. The coin tone mute stage 48 controls the receiver of the handset over lines 54, 56.

The coin tone/coin pulse generator apparatus 30 also includes a supply and regulator stage 58 that produces a logic supply voltage $V_{DD}$ and a ground reference line referred to generally at G. The supply and regulator stage 58 receives input voltage supply from the telephone line pair connected to the central office referred to at A, B.

The coin tone signals at 32 of the coin tone/coin pulse generator apparatus 30 is connected to control a deposit totalizer/time period control stage 62 of timing control apparatus of the present invention referred to generally at 60. The deposit totalizer/time period control stage 62 is effective to sum the number of coin pulse signals at 32 and total the number of basic coin denominations deposited, 5 cent denominations in a specific embodiment. Thus, the deposit totalizer/time period control stage maintains a running total of coin deposit credits prior to establishment of a call and during the call.

The deposit totalizer/time period control stage 62 also includes a rate control signal input 64 supplied by a rate select stage 66. The rate select stage 66 is operative to supply the rate control signal input 64 when a basic time rate period elapses for the particular tariff rate that applies to the individual call that is established. The basic time rate period for each tariff rate corresponds to the number of seconds of call time for each basic coin; for example, 90 seconds/5¢ for tariff rate 1 and 36 seconds/5¢ for tariff rate 2. The tariff rates 1 and 2 in accordance with local telephone tariffs correspond for example to calls placed to another party located within the same city (rate 1) and calls outside the city but within the same zone (rate 2). To accomplish this, the rate select stage 66 includes, in a specific embodiment, four basic time rate period inputs identified as BTR 1 through BTR 4 and four rate select inputs referred to as R1 through R4. However, it should also be understood that the present invention contemplates operation in accordance with any predetermined number of tariff rates and rate selection arrangements.

The basic time rate period inputs BTR 1 through BTR 4 are generated by a call time counting stage 68 under the control of a clock stage 70. The clock stage 70 is enabled upon the establishing of a call by a line reversal signal 72. The line reversal signal 72 is generated by detecting the line reversal from the central office occurring when the called party answers to enable the clock 70 to produce clock signals at 74 to the call time counting stage 68. The clock 70 operates at a predetermined period, 6 seconds for example.

The call time counting stage 68 is selectively programmable to establish a predetermined basic time rate period for each of the respective tariff rates 1 through 4 as will be explained in detail hereinafter. The basic time rate period for each tariff rate is equal to a selectable, predetermined multiple of the clock period.

Upon the establishing of a call and the enabling of the clock 70, the call time counting stage 68 produces a signal at each basic time rate period output BTR 1 through BTR 4 at the expiration of each respective time period established by the selective programming corresponding to each tariff rate designation as programmed in the call time counting stage 68. For example, the BTR 2 output is active after the expiration of the basic time rate period programmed for the tariff rate 2. In a specific example, the basic time rate period for tariff rate 2 is 36 seconds, six times the basic clock period of six seconds. To facilitate the automatic call timing procedure and in a preferred embodiment, the BTR 1-4 outputs are active one clock period prior to expiration of the programmed basic time rate period to provide a warning tone as will be explained in detail hereinafter. Thus, in the specific example, the BTR-2 signal is generated one clock period, six seconds, prior to the expiration of the basic time rate period for the tariff rate 2; the BTR-2 signal is generated after 30 seconds instead of 36 seconds to establish a six second warning period.

The deposit totalizer/time period control stage 62 reduces the purchased time credit by one basic time rate period upon the generation of each time rate control signal at 64 corresponding to the expiration of each basic time rate period for the tariff rate determined by the established call.

Considering a specific call, if 35 cents were deposited either prior to or after establishing the call, i.e. either prior to the called party answering or subsequent to answering of the call, the deposit totalizer/time period control stage 62 would total a 35 cent credit corresponding to a purchased time credit of seven basic time rate periods. Thus, upon the generation of each time rate control signal 64, the purchased time credit of seven basic time rate periods is reduced by one; six basic time rate periods remaining as the purchased time credit. Upon the expiration of seven basic time rate periods for the applicable tariff rate, all the purchased time credit and the coin deposit credit would be utilized and the credit total reduced to 0 unless more coins were deposited and credited prior to expiration of the purchased time period.

At this point, the deposit totalizer/time period control stage 62 generates a purchased time up signal at 80 to enable an audio mute stage 83 to mute the audio path to the receiver of the calling party without dropping the line connection to the called party through the central office. Prior to the expiration of the last basic time rate period of the purchased time credit, as briefly discussed hereinbefore, the deposit totalizer/time period control stage 62 generates a warning signal output at 82. In a preferred embodiment, the warning signal output at 82 is generated one clock period prior to the expiration of the last basic time rate period. The warning signal output at 82 enables a warning tone generator stage 84 to produce an audible warning tone at 85 to the audio path connected to the receiver of the handset. The warning tone alerts the calling party that the last purchased basic time rate period is about to elapse and that no more credit exists. At this point, the calling party either deposits more coins and establishes a corresponding credit in accordance with the total deposited coins in the deposit totalizer/time period control stage 62 or if he does not do so, as explained above the audio mute stage 83 diables the transmitter and the receiver until more coins are deposited. The control outputs of the audio mute stage 83 are 85, 87.

The rate select lines R1-4 are produced by a rate decoder logic stage 90 of a rate control apparatus 92 of the present invention. The rate decoder logic stage 90 is effective to generate an output signal on one of the respective rate select signal lines R1-4 on the basis of the tariff rate that applies to the dialed call in accordance with the number called and the location of the telephone pay station. The location of the pay station is identified by the assigned telephone number in a preferred embodiment; the telephone numbers being assigned according to the local telephone standards that identify the general location of the pay station.

The rate control apparatus 92 of the present invention is programmable to represent the identification of the pay station in accordance with the assigned telephone number in a preferred embodiment. Thus, the rate control apparatus 90 compares the number of the called party dialed at the telephone pay station to the number of the pay station to determine the appropriate tariff rate represented by a signal on one of the rate select lines R1 through R4. The rate select lines R1 through R4 correspond to four respective tariff rates one through four in accordance with a predetermined rate structure established by the local telephone company and tariff rate scheduling authority. For example, the tariff rate 1 line, R1, in a specific embodiment may correspond to a call within the same city as the location of the telephone pay station; rate 2 within the same zone, rate 3 within an adjacent zone and rate 4 within a non-adjacent zone. Thus, the rate determination is accomplished by comparing the digits of the dialed number of the called party with the telephone number assigned to the telephone pay station; for example, the first three digits or exchange representation of the called number with the first three digits of the calling party's number.

The rate control apparatus 92 identifies these significant digits of the called party's number, the first three digits in a specific embodiment, by connecting a dial pulse signal at input 94 to a dial pulse shaper/digit decoder stage 96. The dial pulse shaper/digit decoder stage 96 generates three respective digit enable signals ED-1, ED-2 and ED-3 representing during their respective active states the duration of the first three dialed digits.

The dial pulse shaper/digit decoder stage 96 also produces a dial pulse output signal at 98 that is connected to the clock inputs of three respective counter stages, a first digit counter stage 100, a second digit counter stage 102 and a third digit counter stage 104.

The signal representing the duration of the first dialed digit, ED-1, is connected to enable the first digit counter 100 and similarly the ED-2 and ED-3 lines are respectively connected to the enable inputs of the second digit counter 102 and the third digit counter 104. The three digit counters 100, 102 and 104 produce respective digital outputs D-1, D-2, and D-3 corresponding to the first, second and third dialed digits of the called party's number.

The three digital outputs D-1, D-2 and D-3 are respectively connected to three digit programming stages, a first digit programming stage 110, a second digit programming stage 112 and a third digit programming stage 114. Each of the digit programming stages 110, 112 and 114 are selectively programmed by service personnel to represent the identify of the telephone pay station in accordance with an identification code; in a specific embodiment, the first three digits of the telephone number assigned to the pay station.

The three digit programming stages 110, 112 and 114 each generate respective outputs indicating the results of the comparison of the respective digits of the called party and calling party's number at output buses 120, 122 and 124 to the rate decoder logic stage 90. According to the tariff rate schedule and local calling system regarding assignment of the first three digits of telephone numbers in the predetermined zones, the rate decoder logic stage 90 is arranged to produce a rate select signal on one of the rate select lines R1 through R4 in accordance with the first three digits of the called number.

The rate control apparatus 92 also includes a dial shunt stage 130 including the ED-1 signal and a digital ten output of the first digit counter 100 of the D-1 output. Upon the occurrence of a digital ten output of the D-1 signal during the period of the ED-1 signal, the dial shunt stage 130 produces a dial shunt control output 132. The dial shunt control output signal 132 is connected to bypass loop current around the dial contacts to prevent further dial pulses from being sent. Calls where the first dialed digit is a zero correspond in many telephone calling areas to a long distance call that is to be prohibited from a telephone pay station without first obtaining the assistance of an operator to supervise proper coin deposits for long distance calls. Recognition of other predetermined prefixes and enablement of the dial shunt stage 130 is also contemplated in other embodiments.

The rate control apparatus 92 also includes a postpay decoder stage 134 to enable a postpay mode of operation when the calling party at the pay station dials one of a predetermined set of selected numbers corresponding in a specific local calling area to operator assisted calls. This predetermined set of numbers is associated with predetermined dialed digits in the first two digits positions. In one locale, for example, this corresponds to the first two digits being 10, 19 or 16. If one of these numbers is called, the operator will answer and any initial deposits will be automatically returned by the control apparatus of the telephone pay station in response to a postpay control signal output at 140 of the postpay decoder stage 134. The postpay decoder stage 134 includes the ED-3 signal as an input along with the D-2 digital output of the second digit counter 102 and the digital one line of the D-1 output from the first digit counter 100 to generate the postpay control signal at 140 to the loop/audio/coin control apparatus 150 of the present invention.

The loop/audio/coin control apparatus 150 includes an audio/transmission and protective network generally referred to at 152, a loop control stage 154 and a hookswitch delay stage 156 for appropriate control of the transmission path and the coin collection circuitry. The loop/audio/coin control stage 150 supervises the loop and audio transmission paths and interfaces with the telephone line pair, A, B connected to the central office. The escrow unit 14 is controlled by the loop/audio/coin control stage 150. The escrow unit 14 includes a collect relay, a return relay and three reed switches. The reed switches indicate the presence of coins within the escrow unit 14. For a more detailed discussion of the function and operation of the collect relay, the return relay and the loop control path, reference may be made to the aforementioned copending application Ser. No. 833,511 filed by R. A. Clark, Jr. on Sept. 15, 1977.

Figure 2:
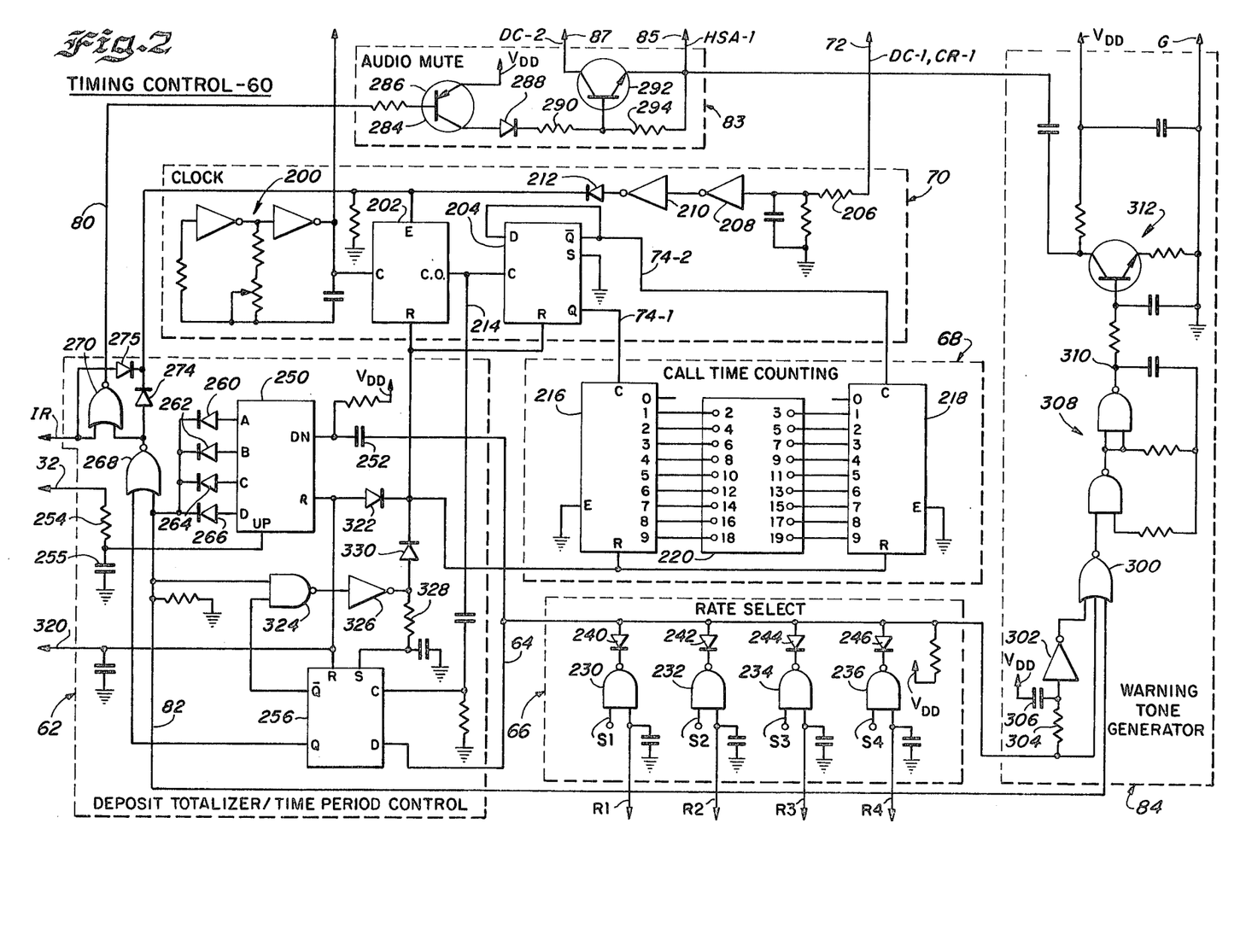
FIG. 2 is a detailed electrical schematic diagram of a specific embodiment of the timing control apparatus of the control apparatus of FIG. 1.

Considering now the details of the timing control apparatus 60 and referring to FIG. 2, in a specific embodiment the clock stage 70 is implemented by a multivibrator stage 200 connected to drive a divide by ten counter stage 202 that produces an output signal 214 having a period equal to 10 times that of the oscillator stage 200. The output 214 of the divide by ten counter stage 202 is connected to a flip-flop stage 204 that supplies the clock signal 74 at the Q and $\overline{Q}$ outputs referred to at 74-1 and 74-2 respectively. Thus, a clock signal output is produced alternately at the outputs 74-1 and 74-2 upon each clock input to the flip-flop stage 204.

The line reversal signal 72 is supplied to the enable input of the divide by ten counter stage 202 through the series connection of a resistor 206, two inverter gates 208 and 210 and a diode 212 connected anode to cathode. The cathode of the diode 212 is connected to the enable input of the divide by ten counter stage 202. The line reversal signal is connected to the DC-1 dial contact.

In a specific embodiment, the multivibrator stage 200 operates to produce an output having a period of 0.6 seconds, the divide by ten output 214 of the counter stage 202 having a period of 6 seconds. The clock signals 74-1 and 74-2 thus produce alternate clock signal outputs every 6 seconds with a clock signal at each of the respective outputs 74-1 and 74-2 occurring every 12 seconds.

The clock signal outputs 74-1 and 74-2 are each connected to the clock inputs of respective counter stages 216 and 218 of the call time counting stage 68. The digital outputs, states 1 through 9, of the counter 216 are each connected to a respective one of nine predetermined inputs of a basic time rate programming array 220. The 1 through 9 state outputs of the counter 216 are respectively connected to the programming array inputs identified as 2, 4, 6, 8, 10, 12, 14, 16 and 18. Further, the digital outputs, states 1 through 9 of the counter 218 are respectively connected to the programming array inputs 3, 5, 7, 9, 11, 13, 15, 17 and 19 of the programming array 220.

The programming array 220 is selectively programmed by service personnel to connect the appropriate basic time rate outputs BTR 1 through BTR 4 between the programming array inputs and the rate select stage 66 to program the predetermined basic time rate period corresponding to each respective rate input of the rate select stage 66.

For example, the programming array inputs 220 identified as numerals 2 through 19, in a specific embodiment each comprise an individual socket in the programming array 220. Four interconnecting rate wires or jumpers BTR 1 through BTR 4 are connected at one end to respective rate inputs S-1, S-2, S-3 and S-4, of the rate select stage 66. The BTR 1 through BTR 4 jumpers at the other end each include a pin that is selectively connected into an appropriate mating socket of the programming array 220 to establish the applicable basic time rate periods for the associated tariff rate in accordance with local telephone tariff authorities.

For example, the basic time rate period for the tariff rate 1 is established by connecting the jumper wire BTR-1 from the S-1 rate of the rate select stage 66 to the socket number 15 of the programming array 220 to establish a tariff rate equal to 90 seconds for a basic time rate period for each 5 cent denomination. The socket number associated with each input of the programming array 220 when multiplied by 6 seconds, the basic clock signal period, corresponds to the number of seconds in the basic time rate period. The tarriff rate one in a specific embodiment corresponds to a call placed to a called party within the same city as the telephone pay station of the calling party.

It can be seen that the interconnections between the counters 216 and 218 and the programming inputs of the array 220 are selected and numbered to correspond to one basic clock signal period, 6 seconds in a specific embodiment, less than the basic time rate that results from multiplying the respective socket numbers by the basic clock period of 6 seconds. The timing is selected in this manner to provide a basic time rate period 6 seconds less than the actual basic time rate period to provide for the generation of the warning tone interval as discussed hereinbefore.

Similarly, the tariff rate 2 is established by connecting the BTR-2 jumper wire from the S-2 rate input line of the rate select stage 66 to the appropriate numbered socket of the programming array 220. For example, if the basic time rate period for tariff rate 2 type call equals 36 seconds, the S-2 BTR-2 jumper wire is connected between rate input and the socket number 6 of the programming array 220. The tariff rate 2 applies to calls within the same zone in a specific embodiment. Similarly, the BTR-3 jumper wire is connected between the S-3 rate line and the socket number 4 to establish a basic time period of 24 seconds for a tariff rate 3 call and the BTR-4 jumper wire is connected between the S-4 line and the socket number 3 of the programming array 220 to establish a basic time rate period of 18 seconds for a tariff rate four call. The tariff rate 3 applies to calls between adjacent zones and tariff rate 4 applies to calls between non-adjacent zones.

Thus, the programming array 220 is selectively programmed to establish a predetermined basic time rate period for each of a predetermined number of tariff rates; one tariff rate being applicable to every call dialed from a telephone pay station with the exception of long distance calls requiring special handling or calls to the operator.

It should be realized that the basic rate time period for each basic coin denomination and thus the tariff rates are conveniently reprogrammed. For example, if the tariff rate 1 changes from 90 sec/5¢ to 84 sec/5¢, the BTR-1 jumper is moved from the 15 socket to the 14 socket of the programmable array 220.

The rate select stage 66 is implemented by an array of four two-input NAND gates 230, 232, 234 and 236 corresponding respectively to the tariff rates 1, 2, 3 and 4. One input of each of the two-input NAND gates 230 through 236 is connected to a respective corresponding rate input S-1, S-2, S-3 and S-4. The other input of each of the NAND gates 230 through 236 is connected to a respective one of the rate select lines R1 through R4 from the rate decoder logic 90.

Thus, if the rate decoder logic 90 for a particular call selects the tariff rate 1 by means of the signal on the rate select line R1, the R1 gate 230 will be active when the S-1 input to the gate connected for example to the programming array input socket number 15 is activated by the seven output state of the counter 218.

Each of the NAND gates 230, 232, 234 and 236 is connected through a respective diode 240, 242, 244 and 246, cathode to anode, to the rate control signal output 64. Thus, a rate control signal 64 is produced whenever one of the basic time rate signal lines BTR-1 through BTR-4 is active corresponding to the selected rate on the respective rate select lines R1 through R4.

The rate control signal 64 is connected to the deposit totalizer/time period control stage 62. The deposit totalizer/time period control stage 64 includes an up-down counter 250 with the down counting input connected through a capacitor 252 to the rate control signal 64. The up counting input of the counter 250 is connected through a series resistor 254 to the coin pulse signal line 32. A capacitor 255 is connected between the up counting input and the reference potential G. The rate control signal 64 is also connected to the D input of a flip-flop 256 of the stage 62. The clock input of the flip-flop 256 is connected to the output of the divide by ten counter stage 202 of the clock stage 70.

The up-down counter 250 is arranged to produce a digital output, BCD for example, at four data outputs A, B, C and D. Thus, the counter 215 can store a credit of up to 15 basic coin denominations or 75¢ corresponding to 15 basic time rate periods of purchased and credited call time. The data outputs A, B, C and D are connected through respective diodes 260, 262, 264 and 266 connected anode to cathode to the time out signal 82.

The time out signal 82 is connected to one input of a two-input NOR gate 268. The second input of the NOR gate 268 is connected to the Q output of the flip-flop 256. The output of the NOR gate 268 is connected to one input of a two-input NOR gate 270. The output of the NOR gate 270 is the audio mute control signal 80. The second input of the NOR gate 270 is connected to an initial rate signal IR derived by the coin tone/coin pulse generator apparatus 30. The output of the NOR gate 268 is also connected through a diode 274 anode to cathode to the enable input of the divide by ten counter 202 of the clock stage 70. Another diode 275 is connected anode to cathode between the IR signal and the enable input of the counter 202.

Thus, when the data outputs A, B, C and D of the updown counter 250 are all zero, the Q output of the flip-flop 256 is clocked zero upon the occurrence of the next clock signal from the divide by ten counter 202. The audio mute control signal 80 is then a low state enabling the audio mute stage 83 to mute the transmitter and the receiver by means of the control outputs 85, 87. The output 85 is connected to the HSA-1 hookswitch contact and the output 87 is connected to the DC-2 dial contact.

The audio mute control signal 80 is connected through a series resistor 284 to the base electrode of a PNP transistor 286. The emitter electrode of the transistor 286 is connected to the $V_{DD}$ supply and the collector electrode is connected through a diode 288 anode to cathode and a series resistor 290 to the base electrode of an NPN transistor 292. The collector electrode of the transistor 292 is connected to the output 87 and the emitter electrode of the transistor 292 is connected to the output 85. A resistor 294 is connected between the base and emitter electrodes of the transistor 292.

At a time equal to one clock signal period prior to the generation of the audio mute control signal 80, the rate control signal 64 changes from a high to low state to control the warning tone generator stage 82 to produce the warning tone to the receiver of the handset over the control line 85. A warning tone is also transmitted to the called party through the hookswitch contact HSA-1 onto the line A. The rate control signal 64 is connected to one input of a three-input NOR gate 300 of the warning tone generator stage 84. A second input of the NOR gate 300 is connected to the purchase time up signal 82. The third input of the NOR gate 300 is connected to the output of an inverter gate 302. The input of the inverter gate 302 is connected through a series resistor 304 to the rate control signal 64. A capacitor 306 is connected between the input of the inverter gate 302 and the $V_{DD}$ supply. Thus, upon the high to low transistion of the rate control signal 64, the low level at the output of the inverter gate 302 remains until the capacitor 306 has charged. With a low level at the purchase time up signal 82, the NOR gate 300 will enable an oscillator stage 308 to operate at a predetermined warning tone frequency, for example 800 Hz. The oscillator stage is enabled to generate warning tone during the charging time of the capacitor 306, approximately 1.2 seconds in a specific embodiment. The output 310 of the oscillator stage 308 is connected through an amplifier transistor stage 312 to the warning tone output 85.

A reset signal 320 produced by the loop/audio/coin control stage 150 is connected to the reset inputs of the flip-flop 256 and the up-down counter 250. The reset signal 320 is also connected through a diode 322 anode to cathode to the reset inputs of the divide by ten counter stage 202 and the two call time counter stages 216 and 218. The $\overline{Q}$ output of the flip-flop 256 is connected to one input of a two-input NAND gate 324. The second input of the NAND gate 324 is connected to the purchase time up signal 82. The output of the NAND gate 324 is connected through an inverter gate 326 and a series resistor 328 to the set input of the flip-flop 256. The inverter gate 326 is also connected through a diode 330 to the reset inputs of the call time counter stages 216, 218 and to the divide by ten counter 202.

Figure 3:
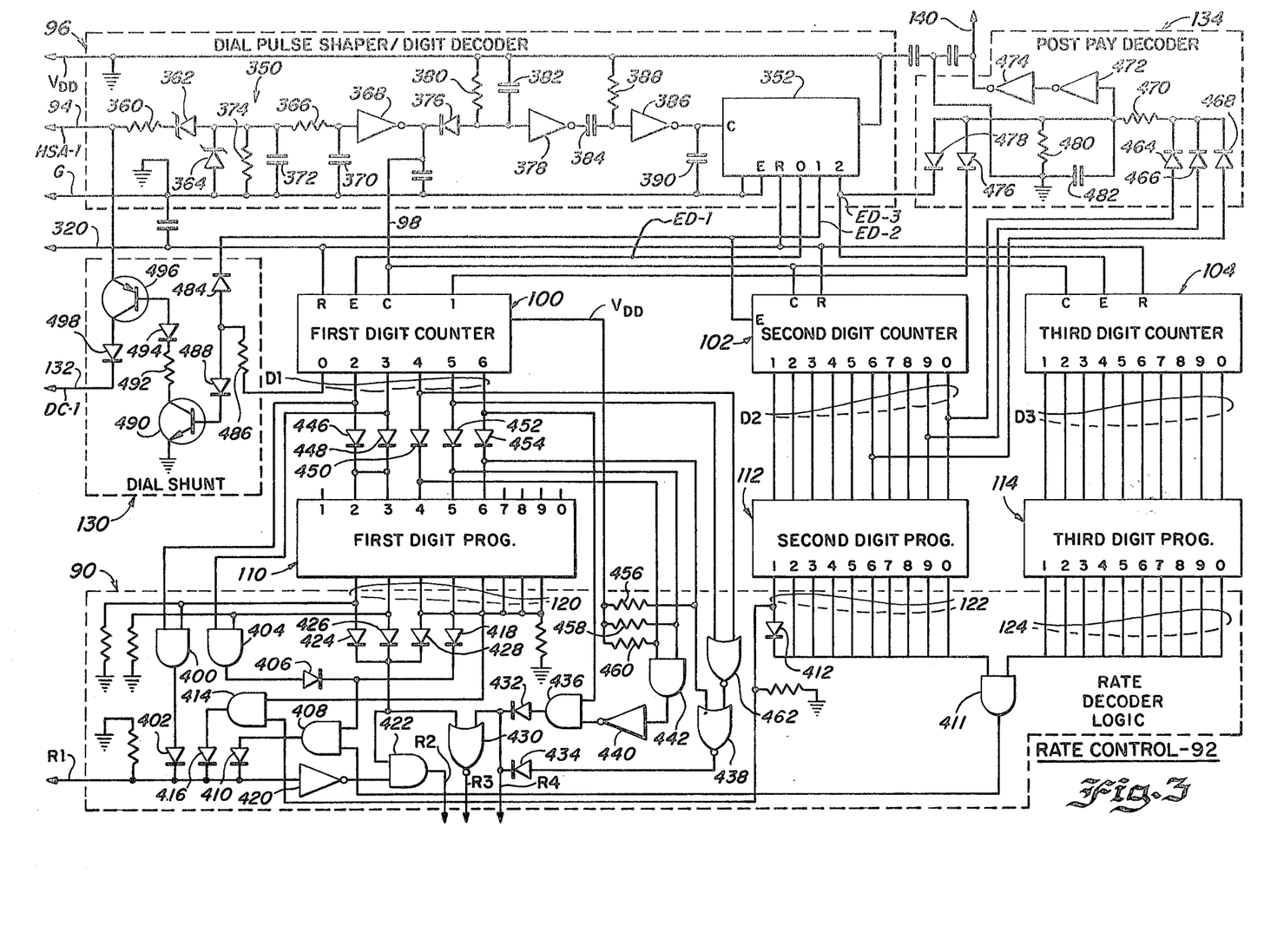
FIG. 3 is a detailed electrical schematic diagram of a specific embodiment of the rate control apparatus of the control apparatus of FIG. 1.

Referring now to FIG. 3 and considering the details of one specific embodiment of the rate control apparatus 92, the first, second and third digital programming stages 110, 112 and 114 are implemented by rotary switches including a detented, rotary member or wheel bearing the circumferentially arranged numerical indicia 1 through 0. Each of the programming stages 110, 112 and 114 also includes a respective input and output terminal corresponding to each numerical position of the rotary switch 1 through 0. The output terminals of the programming stages 110, 112 and 114 correspond to the respective output buses 120, 122 and 124.

The first, second and third digital programming stages 110, 112 and 114 are programmed by service personnel to correspond to the first three digits of the telephone number assigned to the telephone pay station. For example if the telephone pay station is assigned a number 24-13-56 in accordance with local station identification procedures, the three respective rotary switch members are set to the 2, 4 and 1 positions respectively. Each of the rotary switches of the programming stages 110, 112 and 114 includes a switch contact for each numerical position that is arranged to provide a connection between the correspondingly numbered input and output terminals when the programming switch is positioned to the particular position. For example, if the programming switch is rotated to the numeral 3 position, the switch contact connects the 3 input and output terminals. The programming stages 110, 112 and 114 in a specific embodiment include protective covers to insure against inadvertent rotation or changes in the settings.

The dial pulse shaper/digit decoder stage 96 includes a dial pulse shaper stage referred to generally at 350. The dial pulse signal at input 94 is connected to the HSA-1 hookswitch contact and to the input of the dial pulse shaper stage 350. The dial pulse shaper stage 350 at the dial pulse output 98 produces filtered dial pulses to the clock inputs of the three-digit counter stages 100, 102 and 104. The digit counters 100, 102 and 104 are implemented by decade counters providing ten digital output states in accordance with the dial pulses received by each digit counter stage during a respective digit enable time under the control of the ED-1, ED-2 and ED-3 signals. The ED-1, ED-2 and ED-3 digit enable signals are generated by a digit decoder counter 352 and connected to the respective enable leads of the digit counter stages 100, 102 and 104.

The dial pulse shaper circuit 350 includes the series combination of a resistor 360 and two zener diodes 362 and 364 both connected cathode to anode between the dial pulse line 94 and the supply reference potential G. The junction of the two zener diodes 362 and 364 is connected through a series resistor 366 to the input of an inverter gate 368. A capacitor 370 is connected between the input to the inverter gate 368 and the reference potential G. A second capacitor 372 is connected between the junction of the zener diodes 362, 364 and the reference potential G. A resistor 374 is connected across the capacitor 372. The output of the inverter gate 368 is connected through a diode 376, cathode to anode, to the input of an inverter gate 378. The parallel combination of a resistor 380 and a capacitor 382 is connected between the input of the inverter gate 378 and the $V_{DD}$ supply line. The output of the inverter gate 378 is connected through a capacitor 384 to the input of an inverter gate 386. The output of the inverter gate 386 is connected to the clock input of the digit decoder counter 352. A resistor 388 is connected between the input of the inverter gate 386 and the $V_{DD}$ supply line. A capacitor 390 is connected between the output of the inverter gate 386 and the supply reference potential G.

Upon the occurrence of dial pulses during the first dialed digit, the capacitor 382 is quickly charged by each low period of the dial pulses but is not discharged at the same rate due to the presence of the diode 376. The capacitor 382 is discharged at a much slower rate through the resistor 380. Thus, during each digit, the capacitor 382 is not substantially discharged until the interdigital time period between the dialing of digits. During the interdigital time, the capacitor 382 discharges and produces a pulse at the clock input of the counter 352. Initially, the decoder counter 352 is reset to the 0 output state by the reset signal 320. Thus, during the first digit, the digit decoder counter at data output 0 activates the first enabled digit line ED-1. On each succeeding clock pulse to the counter 352, the second and third enable digit signals ED-2 and ED-3 are successively activated. The ED-1, ED-2 and ED-3 ouputs of the digital decoder counter 352 correspond to the 0, 1 and 2 data outputs respectively.

The D-1, D-2 and D-3 digital output signals of the respective digit counters 100, 102 and 104 each include 10 digital output lines corresponding to the 1 through 0 data outputs. The D-1, D-2 and D-3 digital outputs are connected to corresponding switch contacts of the respective first, second and third digit programming stages 110, 112 and 114.

In accordance with the specific telephone numbering assignment being considered in conjunction with FIG. 2, the 7, 8 and 9, data outputs of the D-1 signal are not utilized. The 2, 3, 4, 5 and 6 data outputs of the digital output signal D-1 from the first digit counter stage 100 are connected through respective diodes 446, 448, 450, 452 and 454 to the first digit programming stage 110.

The rate decoder logic 90 in FIG. 3 illustrates a specific embodiment implemented by discrete logic gates and diode logic connections to compare the pay station identification number programmed on the first, second and third programming stages 110, 112 and 114 with the three dialed digits stored at the output of the first, second and third digit counters 100, 102 and 104 respectively. In other embodiments, the present invention contemplates various other digital decoding circuits, programmable logic arrays and comparators to produce the rate select signals R1 through R4.

Considering the details of the specific implementation of the rate decoder logic 90 illustrated in FIG. 3, a two-input AND gate 400 has one input connected to the two output terminal of the first digit programming switch 110 of the output bus 120. The second input of the gate 400 is connected to the two data output of the D1 output of the first digit counter 100. The output of the AND gate 400 is connected through a diode 402, anode to cathode, to the rate select line R1.

A two-input AND gate 404 of the rate decoder logic 90 has one input connected to the three output terminal of the bus 120 and the second input to the three data output of the D1 signal. The output of the gate 404 is connected through a diode 406, anode to cathode, to one input of a two-input AND gate 408. A diode 418 is connected anode to cathode between 4, 5, 6, 7, 8, 9 and 0 outputs of the bus 120 of the first digit programming stage 110, and the input of the AND gate 408 that is connected to the diode 406. The output of the AND gate 408 is connected through a diode 410 anode to cathode to the rate select line R1. The second input of the AND gate 408 is connected to the output of a two-input AND gate 411. One input of the AND gate 411 is connected to all ten lines of the output bus 124 of the third digit programming stage 114. The second input of the AND gate 411 is connected to the 9 outputs 2 through 0 of the second digit programming stage output bus 122 and to the one output of the second digit programming switch 112 through a diode 412. The diode 412 is connected anode to cathode between the one output terminal of the second digit programming stage 112 and the input of the gate 410.

Another two-input AND gate 414 of the rate decoder logic 90 has one input connected to the one state terminal of the bus 122 of the second digit programming stage 112. The second input of the gate 414 is connected to the 4, 5, 6, 7, 8, 9 and 0 output terminals of the bus 120 of the first digit programming stage 110. The output of the AND gate 414 is connected through a diode 416, anode to cathode, to the rate select line R1.

Thus, the AND gates 400, 404, 408, 411 and 414 along with the diodes 402, 406, 410, 416 and 418 of the rate decoder logic 90 provide the decoding logic to establish the rate select signal at R1 corresponding to the tariff rate 1 condition.

Considering the portions of the rate encoder logic 90 to determine the rate select signal at R2 corresponding to the tariff rate 2 condition, an inverter gate 420 has an input connected to the rate select line R1. The output of the gate 420 is connected to one input of an AND gate 422. The output of the AND gate 422 is connected to the rate select line R2. The second input to the AND gate 422 is connected to the cathodes of three diodes 424, 426 and 428. The anodes of the diodes 424, 426 and 428 are respectively connected to the two, three and the four through zero output terminals of the first digit programming stage output bus 120.

To decode the rate select signal R3, a two-input NOR gate 430 has one input connected to the cathodes of the diodes 424, 426 and 428. The second input of the gate 430 is connected to the cathodes of two diodes 432 and 434. The output of the two-input NOR gate 430 is connected to the rate select line R3. The anode of diode 432 is connected to the output of a two-input AND gate 436. The anode of the diode 434 is connected to the output of a two-input NOR gate 438. One input of the two-input AND gate 436 is connected to the six data output of the first digit counter output D1. The second input of the gate 436 is connected to the output of an inverter gate 440. The input to the inverter gate 440 is connected to the output of a two input AND gate 442. The 2, 3, 4, 5 and 6 data outputs of the D1 digital output of the first digit counter 100 are respectively connected to the 2 through 6 inputs of the first digit programming stage 110 through respective diodes 444, 446, 448, 450 and 452 in anode to cathode fashion. The inputs to the AND gate 442 are respectively connected to the cathodes of the diodes 450 and 452. Three pull-up resistors 456, 458 and 460 are respectively connected between the $V_{DD}$ supply line and the cathode of the diodes 454, 452 and 450. One input of the NOR gate 438 is connected to the cathode of the diode 454. The second input of the gate 438 is connected to the output of a two-input NOR gate 462. The inputs to the NOR gate 462 are respectively connected to the 4 and 5 data outputs of the D1 bus. The rate select line R4 is connected to the cathodes of the diodes 432 and 434.

The postpay decoder stage 134 includes three diodes 464, 466 and 468 having their cathodes connected in common and their anodes connected respectively to the 0, 9 and 6 data outputs of the D2 output bus of the second digit counter stage 102. The common connected cathodes of the diodes 464, 466 and 468 are connected through a series resistor 470 to the input of an inverter gate 472. The output of the inverter gate 472 is connected to the input of an inverter gate 474. The output of the inverter gate 474 is connected to the postpay control line 140. The input to the inverter gate 472 is also connected through a diode 476, anode to cathode, to the one data output of the D1 output. Another diode 478 is connected anode to cathode between the input of the inverter gate 472 and the ED-3 signal of the digit decoder counter 352. The parallel combination of a resistor 480 and a capacitor 482 is connected between the input of the inverter gate 472 and the supply reference potential G.

Thus, upon the first two dialed digits corresponding to either a 10, 16 or 19, the postpay control output 140 is active as described hereinabove to return the deposited coins, if any.

The dial shunt stage 130 includes a diode 484 having the cathode lead connected to the ED-2 signal and the anode connected through a resistor 486 to the 0 data output of the D1 output of the first digit counter 100. The anode of the diode 484 is also connected through a diode 488 anode to cathode to the base electrode of an NPN transistor 490. The emitter electrode of the transistor 490 is connected to the reference potential G and the collector electrode of the transistor 490 is connected through a series resistor 492 to the cathode of a diode 494. The anode of the diode 494 is connected to the base electrode of a PNP transistor 496. The emitter electrode of the transistor 496 is connected to the dial pulse line 94, hookswitch contact HSA-1. The collector of the transistor 496 is connected through a diode 498, anode to cathode, to the dial shunt control line 132 at the dial contact DC-1.

Thus, upon the detection of a 0 dialed in the first digit, the dial shunt stage 130 is effective to place a shunt through the collector to emitter junction of the transistor 496 on lines 94 and 132 prohibiting any further outpulsing to the central office.

Figure 4:
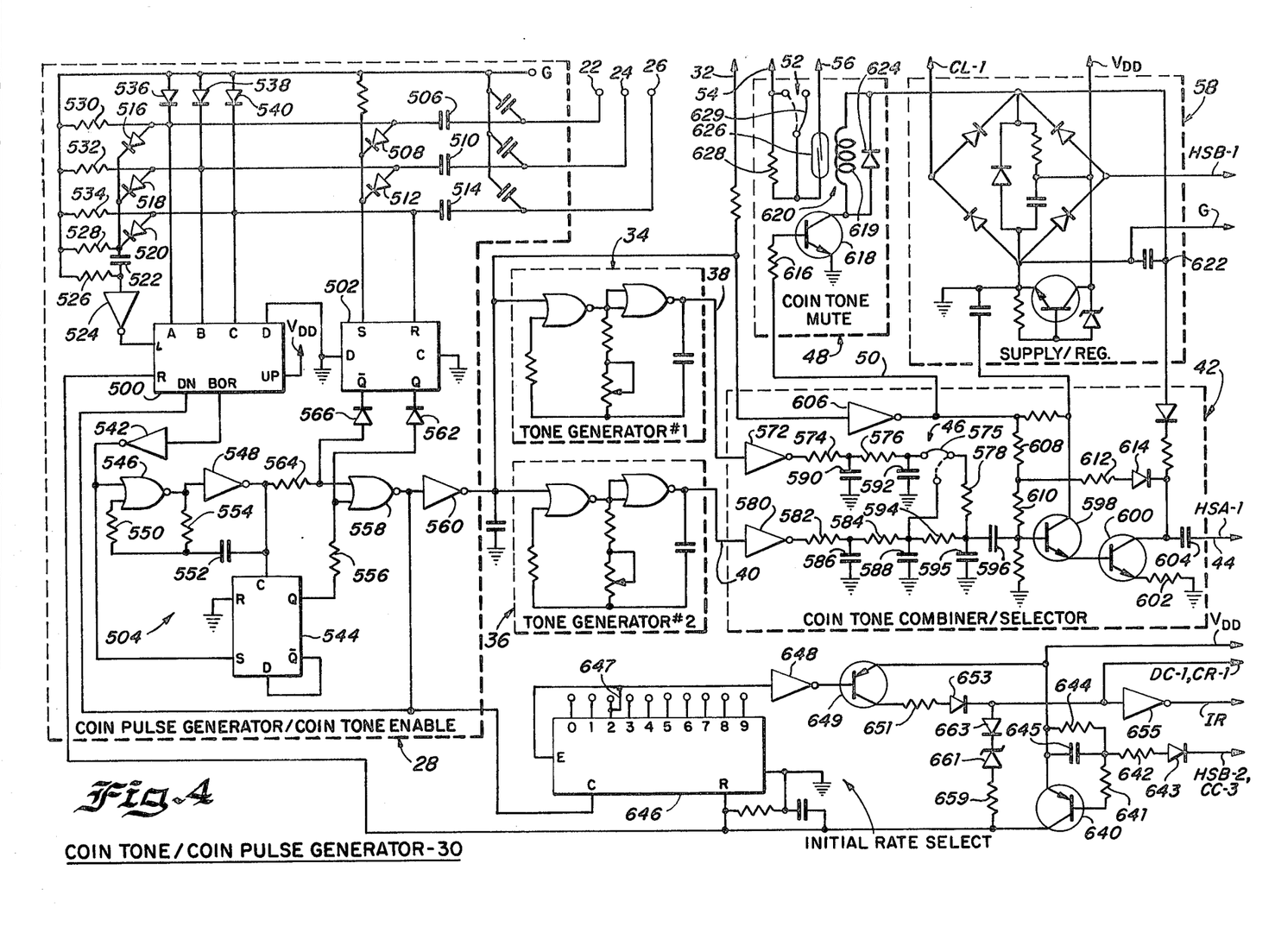
FIG. 4 is a detailed electrical schematic diagram of a specific embodiment of the coin tone/coin pulse generator apparatus of the control apparatus of FIG. 1.

Referring now to FIG. 4 and considering the details of a specific embodiment of the coin tone/coin pulse generator stage 30, the coin pulse generator/coin tone enable stage 38 includes a coin denomination counter 500, a flip-flop 502 and an oscillator stage 504 that are interconnected to receive the coin denomination pulse signals 22, 24 and 26 from the annunciator unit 20 to generate the coin pulse signals at 32.

A coin pulse signal at 32 is produced having a predetermined time duration, for example approximately 50 to 70 msec., for each basic coin denomination deposited.

The 5 cent annunciator coin signal line 22 is connected through a capacitor 506 to the A data input of the counter 500. The A data input is also connected through a diode 508, anode to cathode, to the set input of the flip-flop 502. The 10 cent denomination coin signal line 24 is connected through a capacitor 510 to the B data input of the counter 500. The B data input is also connected through a diode 512, anode to cathode, to the set input of the flip-flop 502. The 25 cent coin denomination signal line 26 is connected through a capacitor 514 to the reset input of the flip-flop 502 and to the C data input of the counter 500.

The A, B and C data inputs of the counter 500 are also connected through respective diodes 516, 518 and 520, anode to cathode, to one end of a capacitor 522. The other end of the capacitor 522 is connected to the input of an inverter gate 524. The output of the inverter gate 524 is connected to the load input of the counter 500. The input of the inverter gate 524 is also connected through a resistor 526 to the supply reference potential G. The cathodes of the diodes 516, 518 and 520 are connected through a resistor 528 to the reference potential G. The anode of each of the diodes 516, 518 and 520 is connected through respective resistors 530, 532 and 534 to the reference potential G.

Each of the data inputs A, B and C of the counter 500 is connected through respective diodes 536, 538 and 540, cathode to anode, to the reference potential G. The D data input of the counter 500 and the D input of the flip-flop 502 are connected to the supply reference potential G. The borrow data output, BOR, of the counter 500 is connected through an inverter gate 542 to the oscillator stage 504.

The oscillator stage 504 includes a flip-flop 544 having a set input connected to the output of the inverter gate 542 and also to one input of a two-input NOR gate 546. The output of the NOR gate 546 is connected to the input of an inverter gate 548. The output of the inverter gate 548 is connected to the clock input of the flip-flop 544. The second input of the NOR gate 546 is connected through the series combination of a resistor 550 and a capacitor 552 to the output of the inverter gate 548. A resistor 554 is connected between the input of the inverter 548 and the junction of the resistor 550 and the capacitor 552.

The $\overline{Q}$ output of the flip-flop 554 is connected to the D input and the reset input is connected to the reference potential G. The Q output of the flip-flop 544 is connected through a resistor 556 to one input of a two-input NOR gate 558. The output of the NOR gate 558 is connected to the down counting input of the counter 500. The output of the NOR gate 558 is also connected to the input of an inverter gate 550. The output of the inverter gate 560 is connected to the coin pulse signal 32. The junction of the resistor 556 and input to the NOR gate 558 is connected through a diode 562, anode to cathode, to the Q output of the flip-flop 502. The clock input of the flip-flop 544 is connected through a series resistor 564 to the second input of the NOR gate 558. The second input of the NOR gate 558 is also connected to a diode 566, anode to cathode, to the $\overline{Q}$ output of the flip-flop 502. The clock input of the flip-flop 502 is connected to the reference potential G.

Thus, upon the occurrence of a pulse on the 5 cent annunciator line 22, the counter 500 is set to a 1 state by the simultaneous input at the load and A data inputs. This enables the oscillator stage 504 which operates at a frequency of 15 Hertz in a specific embodiment. The flip flop 544 divides the oscillator output at the inverter gate 548 by 2 to produce a 7½ Hertz output at the Q output of the flip-flop 544. The first cycle of operation of the oscillator 504, a 7½ Hertz signal passes through the two-input NOR gate 558 to decrement the counter 500 from the initially set state 1 to a 0 state. Thus, 1 coin pulse is generated at the coin pulse signal output 32.

When a pulse is received on the 10 cent coin denomination line 24, the counter 500 is set to a two state and thus two pulses are produced at the coin pulse signal output 32. When a pulse is generated on the 25 cent coin denomination line 26, the counter 500 is set to a four state, and the 15 Hertz signal at the output of the inverter gate 548 is passed directly through the NOR gate 558 to the coin pulse output 32. Thus, the first pulse generated at the output of the NOR gate 558 has no effect on the counter 500 due to the timing at the load input and inhibits any counting action. When the second, third, fourth and fifth pulses arrive, the counter 500 decrements one count for each pulse and thus five pulses are produced at the coin pulse signal output 32 at a 15 Hertz rate; the flip-flop 502 being reset by the 25 cent coin denomination pulse on line 26.

The coin pulse signal line 32 is connected to the tone generator stages 34 and 36. The tone generator stages 34 and 36 are respectively arranged to oscillate at 1700 Hertz and 2200 Hertz. The outputs 38 and 40 of the tone generator stages 34 and 36, respectively, are combined by the coin tone combiner/selector stage 42 to produce the audio coin tone output signal at 44 connected to the hookswitch contact HSA-1.

The output 38 of the tone generator stage 34 is connected through an inverter gate 572 and two series resistors 574 and 576 to the dual tone select terminal of a tone selection arrangement 46. The tone selection arrangement 46 includes a jumper wire 575 connected between the resistor 576 and one end of a resistor 578 in the dual tone position. The output 40 of the second tone generator 36 is connected through an inverter gate 580 and two series resistors 582 and 584 to a single tone select terminal of the tone selection arrangement 46. The jumper 575 is connected between the resistor 578 and the single tone select terminal to provide selection of a single coin tone frequency mode of operation.

A capacitor 586 is connected between the reference potential G and the junction of resistors 582 and 584. A capacitor 588 is connected between the junction of the single tone select terminal of the selection arrangement 46 and the resistor 584, and the reference potential G. Similarly, a capacitor 590 is connected between the junction of the resistors 574 and 576, and the reference potential G. Another capacitor 592 is connected between the dual tone select terminal of the selection arrangement 46, and the reference potential G. The junction of the capacitor 588 and the resistor 584 is connected through a series resistor 594 to one end of a capacitor 595. The other end of the capacitor 595 is connected to the reference potential G. The resistor 578 is connected between one end of the select jumper wire 575 and the junction of the resistor 594 and the capacitor 595.

The junction of the resistors 578 and 594 is connected through a capacitor 596 to the base electrode of an NPN transistor 598. The emitter electrode of the transistor 598 is connected to the base electrode of a second NPN transistor 600. The emitter of the transistor 600 is connected to the reference potential G through a resistor 602. The collector electrode of the transistor 600 is connected to the coin tone output line 44 through a capacitor 604.

The coin pulse signal line 32 is also connected through an inverter gate 606 and two series resistors 608 and 610 to provide a bias supply to the base electrode of the transistor 598. The junction of the resistor 608 and 610 is also connected through a series resistor 612 and a diode 614, anode to cathode, to the collector of the transistor 600.

The output of the inverter gate 606 is also connected to the coin tone mute stage 48 by the coin tone mute control line 50. The coin tone mute control line 50 is connected through a series resistor 616 to the base electrode of an NPN mute control transistor 618. The emitter electrode of the transistor 618 is connected to reference potential G. The collector electrode of the transistor 618 is connected through a relay coil 619 of a relay 620 to a supply output 622 of the supply and regulator stage 58. A suppression diode 624 is also connected anode to cathode between the collector of the transistor 618 and the supply line 622. A set of relay contacts 626 are controlled by the relay 620. The contacts 626 are closed upon activation of the coin tone mute control line 50. The relay contacts 626 and a series resistor 628 are connected between the coin tone mute audio control lines 54 and 56. A coin tone mute selection arrangement generally referred to at 52 includes a jumper wire 629. In the muted condition, the jumper wire 629 is connected between the audio control line 54 and the junction of relay contacts 626 and the resistor 628. The audio control lines 54 and 56 are connected across the receiver of the handset. Thus, in the muted condition the receiver element of the handset is totally shunted or muted. In the partially muted position, the jumper wire 629 is removed from the audio control line 54 and the resistor 628 and the relay contacts 626 are placed across the receiver during coin tone generation.

The supply and regulator stage 58 includes a diode bridge, a zener diode and associated power supply circuitry to provide the $V_{DD}$ reference supply output and a loop supply signal at CL-1. The input to the diode bridge is the HSB-1 hookswitch contact.

The reset input of the coin denomination counter 500 is connected to the collector electrode of an PNP transistor 640. The base electrode of the transistor 640 is connected through the series combination of two resistors 641 and 642 and a diode 643, anode to cathode, to the HSB-2 hookswitch contact. The totalizer counter 500 is reset when the handset is placed on-hook, the HSB-2 hookswitch contact being connected in the on-hook state to the B line of the telephone line pair A, B. The emitter electrode of the transistor 640 is connected to the $V_{DD}$ reference supply output and through a resistor 644 to the junction of the resistors 641 and 642. A capacitor 645 is connected in parallel with the resistor 644.

In a specific embodiment, an initial rate select arrangement is provided by an initial rate counter 646 and an initial rate select jumper wire 647. The initial rate select arrangement establishes a selectable, predetermined number of initial basic coin denomination deposits that is required to complete the call. For example, if an initial rate of two basic coin denominations is required by tariff schedules, after the called party answers, the audio will be muted and call timing will not begin until the two basic coin denominations are deposited. However, the purchased call time credit is established as coins are deposited corresponding to the two basic coin denominations; a purchased call time credit of two basic time rate periods is established as coins are deposited but the call cannot be completed until the two basic coin denominations are deposited.

The clock input of the initial rate counter is connected to the output of the NOR gate 558 to advance the counter 646 upon the generation of each coin pulse. The enable input of the initial rate counter 646 is connected through an inverter gate 648 to the base electrode of a PNP transistor 649. The emitter electrode of the transistor 649 is connected to the $V_{DD}$ reference supply output. The collector electrode of the transistor 649 is connected through a series resistor 651 and a diode 653, anode to cathode, to the DC-1 dial contact and the CR-1 side of the collect relay. The reset input of the initial rate counter 646 is connected through a series resistor 659, a zener diode 661, anode to cathode, and a diode 663, cathode to anode to the input of an inverter gate 655 and to the CR-1 side of the collect relay. The reset input of the initial rate counter 646 is also connected to the collector electrode of the transistor 640. The output of the inverter gate 655 generates an initial rate signal IR to the timing control apparatus 60.

The initial rate select jumper wire 647 is connected at one end to the enable input of the initial rate counter 646. The other end of the initial rate select jumper wire 647 is selectively connected to one of the ten digital output states 0 through 9 of the counter 646.

For example, if an initial rate of two coin denominations is selected the jumper wire 647 is connected to the 2 output state of the counter 646. Before the deposit of any coins, the initial rate signal IR is a high logic level. Upon the first two coin pulses generated corresponding to the deposit of two basic coin denominations, the IR signal will switch to a low level.

Considering the timing control stage 60, FIG. 2, the initial rate signal IR is connected to the second input of the NOR gate 270. The initial rate signal IR is also connected through the diode 275 to the clock enable line, the enable input of the counter 202.

Figure 5:
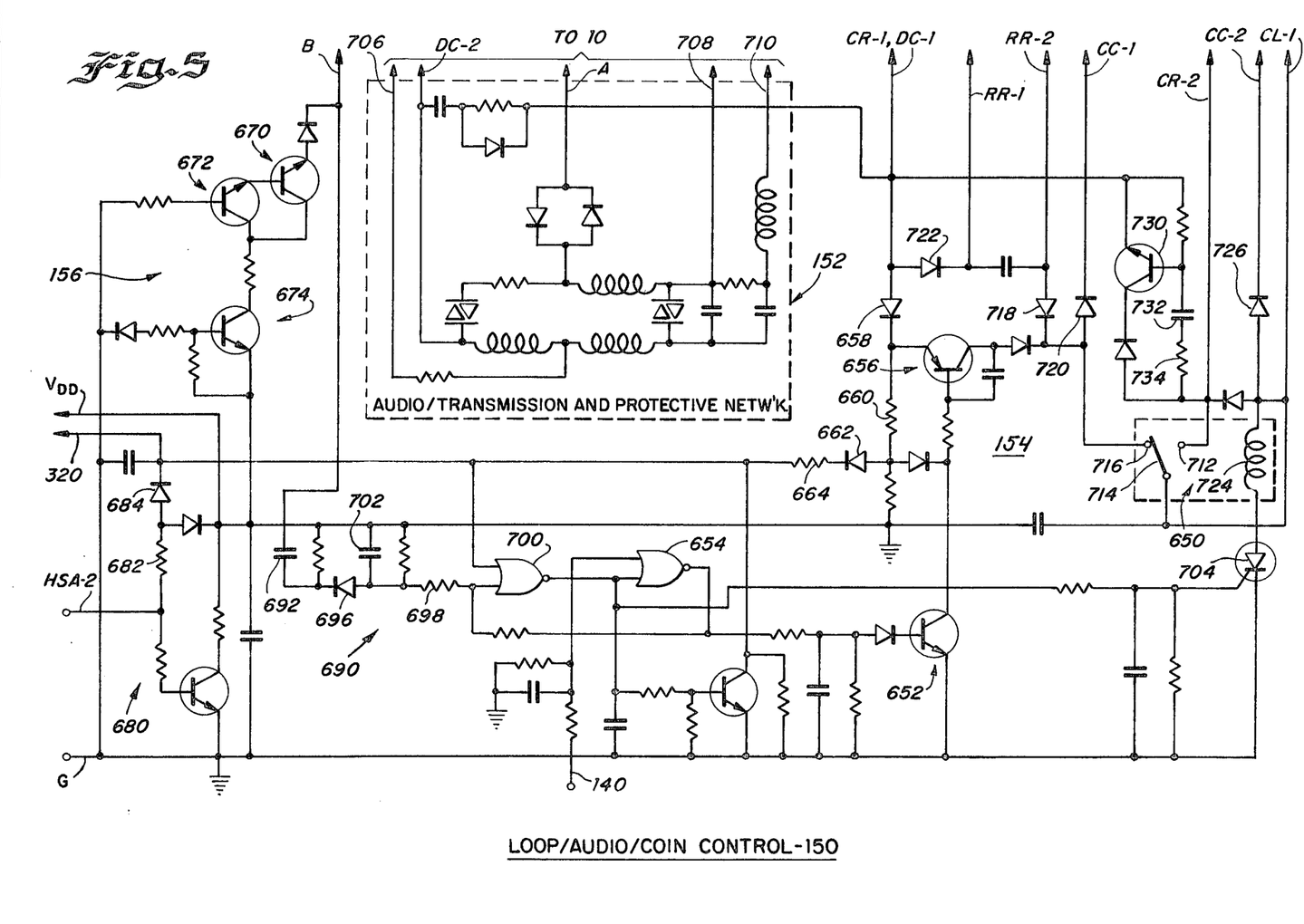
FIG. 5 is a detailed electrical schematic diagram of a specific embodiment of the loop/audio/coin control apparatus of the control apparatus of FIG. 1.

When the initial rate signal IR is a high level, i.e. before the deposit of the initial rate coin deposits, the audio is muted through the audio mute stage 83 and the clock stage 70 is disabled. After two basic coin denominations have been deposited the IR signal will switch to a low level and the audio path is restored to the handset by the audio mute stage 83. Further, the clock stage 70 is enabled to begin the timing of the basic time rate period established by the call time counting stage 68. A purchased time credit has been established as discussed hereinbefore corresponding to two basic time rate periods for the two basic coin denominations. the initial rate counter 646 is inhibited from further counting beyond the initial rate selected through the enable input. The initial rate counter 646 is reset along with the coin denomination counter 500 when going on-hook. The initial rate counter 646 is also reset when the return relay is operated to return coins via the RR-1 side of the return relay and the diode 722 connected between the CR-1 line and the RR-1 line (FIG. 5). The initial rate counter is prevented from being reset upon generation of the IR signal due to the presence of the zener diode 661.

In a specific embodiment, the coin tone/coin pulse generator apparatus 30, the timing control apparatus 60, the rate control apparatus 92 and the loop/audio/coin control apparatus 150 are each fabricated as individually inserted printed wire cards for individual insertion and removal. Thus, the control apparatus of the present invention is easily maintained and serviced as a modular system.

The loop/audio/coin control apparatus 150 in a specific embodiment is implemented as illustrated in FIG. 5. When the handset of the pay station is brought off-hook, loop current flows through the pay station circuitry and the return relay thus energizing the return relay. The off-hook condition corresponds to the HSA-1 and HSB-1 contact position of the hookswitch. The loop current passes through the power supply and regulator stage 58, causing the associated circuitry to charge up to generate the normal $V_{DD}$ supply voltage, 4 volts DC in a specific embodiment. As the $V_{DD}$ voltage rises toward the 4 volt level, the NPN transistor 652 is biased to conduction by the output of a two-input NOR gate 654. The output of the gate 654 follows the rise of the $V_{DD}$ supply line. The transistor 652 is connected to render a PNP transistor 656 conductive. The transistor 656 is connected to bypass the loop current when conductive. This bypassing of the loop current de-energizes the return relay. The initial sequence described herein takes place in approximately one second.

During the time that the return relay is energized, current also flows through the series conbination of a diode 658, anode to cathode, a resistor 660, a diode 662, anode to cathode, and a resistor 664 to the reset signal line 320. The reset signal ceases upon conduction of the transistor 656. The control apparatus is now initialized and ready to process a call.

The hookswitch delay stage 156 includes the transistor stages 670, 672 and 674 connected to sense the hookswitch contact and to bypass the loop current around the switch contacts when the hookswitch is rapidly operated. This insures against simulation of dial pulses by use of the hookswitch.

When the handset is placed on-hook after a call, the hookswitch contacts open and the voltage across them is connected to an on-hook reset circuit 680. The on-hook reset circuit 680 includes the series combination of a resistor 682 and a diode 684, anode to cathode, connected between the hookswitch contact HSA-2 and the reset line 320. Thus, the control apparatus is reset.

An incoming collect circuit generally referred to at 690 includes a capacitor 692 connected at one end to the B line from the central office. The other end of the capacitor 692 is connected through a diode 696 cathode to anode and a resistor 698 to an input of a two-input NOR gate 700. A filtering capacitor 702 is connected between the junction of the diode 696 and the resistor 698, and the $V_{DD}$ supply line. With ringing voltage present, the output of the gate 700 is connected to control an SCR 704. The SCR 704 operates a control relay 650 to condition the pay station to automatically collect deposited coins in a postpay mode.

In the audio tansmission and protective network 152, the lines 706, 708 and 710 are connected to the transmitter and receiver elements of the handset.

The anode of the diode 658 is connected to one side CR-1 of the collect relay. The other side CR-2 of the collect relay is connected to the normally open contact 712 of the relay 650. The control loop signal CL-1 from the supply/regulator stage 58 is connected to the common terminal of the contacts 714 of the relay 650. The normally closed contact 716 of the relay 650 is connected through a diode 718, cathode to anode, to one side RR-2 of the return relay. The contact 716 is also connected through a diode 720, diode to cathode, to a coin control line CC-1. The HSB-2 hookswitch contact is connected to another coin control line CC-3. The relay coil 724 of the control relay 650 is connected at one end through a diode 726, anode to cathode, to a coin control line CC-2. The other side of the relay coil 724 is connected to the anode of the SCR 704. A reed-switch of the escrow unit 14 that operates to close a set of contacts when coins are present is connected between the control line CC-2 and CC-3. The other side of the return relay RR-1 is connected through a diode 722, cathode to anode, to the anode of the diode 658 and the CR-1 side of the collect relay.

The emitter electrode of a collect delay transistor 730 is connected to the CR-1 side of the collect relay and to the DC-1 dial contact. The base electrode of the transistor 730 is connected through a capacitor 732 and a series resistor 734 to the contact 712 of the relay 650. Upon polarity reversal of the telephone line pair, the capacitor 732 charges. While the capacitor 732 charges, the transistor 730 conducts for approximately 0.5 seconds to bypass loop current. Thus, a collect delay is provided to prevent momentary polarity reversal from collecting coins.

Two of the reed switches in the escrow unit 14 open when coins are deposited. One contact of each of the reed switches is connected to the CR-1 collect relay terminal. The other contact of the reed switch is connected through a diode, anode to cathode, to the CR-2 collect relay terminal. The second reed switch has the other contact connected to the CC-1 line.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Telephone station apparatus of the type wherein coins are deposited for the payment of telephone calls on the basis of established tariff rates and having a telephone receiver and transmitter, the telephone station apparatus comprising:

coin depositing and collection means for controlling the collection of coins deposited into said telephone station apparatus;

means responsive to said coin depositing and collection control means for generating coin credit pulses in accordance with the number of coins and denominations of coins deposited;

means responsive to said coin credit pulse generating means and a basic call time period signal for maintaining a purchased call time credit as coins are deposited in terms of a number of basic coin denomination units, said purchased call time credit being incremented by the basic coin denomination units of deposited coins and as coins are deposited at any time during a telephone call and decremented by one basic coin denomination unit upon each occurrence of said basic call time period signal, said coin depositing and collection controlling means being operative to collect all deposited coins during a telephone call after the called party has answered in accordance with an answer signal from the central office apparatus to which the telephone station apparatus is intended to be connected;

means responsive to the telephone number inputted to the station apparatus by a station apparatus user and to an identification number of the telephone station apparatus for generating a rate select signal on one of a plurality of rate select outputs in accordance with the tariff rate determined by the number inputted to the telephone station apparatus;

means responsive to said rate select outputs for generating a predetermined one of a plurality of repetitive basic call time period signals in accordance with said rate select signal;

means responsive to said purchased call time credit means for generating a warning time signal to the receiver of the telephone station apparatus when the purchased call time credit is decremented to one basic coin denomination unit corresponding to one basic call time period; and means responsive to said purchased call time credit means for muting the audio path of the telephone station apparatus receiver and transmitter whenever the purchased call time credit is decremented to zero basic coin denomination units.

2. The telephone station apparatus as recited in claim 1 wherein said basic call time period signal generating means includes means for generating a plurality of basic call time period outputs and means having as inputs a predetermined number of said basic call time period outputs and said rate select outputs for outputting said basic call time period signal, said basic call time period signal outputting means being arranged to output said basic call time period output corresponding to one of said rate select outputs in accordance with a predetermined relationship between said basic call time period output and said rate select outputs, said basic call time period signal generating means further including selective connection means for connecting said predetermined number of said plurality of basic call time period outputs to said basic call time period signal outputting means whereby the basic call time period associated with each of said rate select outputs can be selectively reprogrammed.

3. The telephone station apparatus as recited in claim 1 wherein said rate select signal generating means includes means for comparing predetermined digits of the telephone number inputted with the identification number of the station apparatus and decoder means responsive to said comparing means for determining said rate select signal being an output on one of said rate select outputs in accordance with the results of the comparison of the digits.

4. The telephone station apparatus as recited in claim 3 wherein said decoder means further comprises a programmable digit switch for each of said predetermined digits, each of said programmable digit switches including respective input and output terminals corresponding to each of ten numerical positions and a movable switch contact that completes a connection between the respective input and output of the numerical position to which the programmable switch is positioned, each of the programmable digit switches being positioned to the numeral corresponding to the digit of the station apparatus associated with the respective programmable digit switch.

5. The telephone station apparatus as recited in claim 1 further comprising means for generating a signalling inhibit signal to prevent signalling in the telephone line in response to said telephone number inputted to said station apparatus corresponding to one of a predetermined number of prohibited calls as identified by the digits of the inputted number.

6. The telephone station apparatus of claim 1 further comprising means for generating a post-pay decoder signal in response to the telephone number inputted to the station apparatus being one of a predetermined set of numbers having predetermined digits identifying operator assisted calls, said coin depositing and collection controlling means being responsive to said post-pay decoder signal for returning deposited coins.

7. Telephone station apparatus of the type wherein coins are deposited for the payment of telephone calls on the basis of established tariff rates and having a telephone receiver and transmitter, comrpising:

means responsive to said coin depositing and collection control means for generating coin credit pulses in accordance with the number of coins and denominations of coins deposited;

means responsive to said coin credit pulse generating means and a basic call time period signal for maintaining a purchased call time credit as coins are deposited in terms of a number of basic coin denomination units, said purchased call time credit being incremented by the basic coin denomination units of deposited coins and as coins are deposited at any time during a telephone call and decremented by one basic coin denomination unit upon each occurrence of said basic call time period signal, said coin depositing and collection controlling means being operative to collect all deposited coins during a telephone call after the called party has answered in accordance with an answer signal from the central office apparatus to which the telephone station apparatus is intended to be connected;

means responsive to the telephone number inputted to the station apparatus by a station apparatus user and to an identification number of the telephone station apparatus for generating a rate select signal on one of a plurality of rate select outputs in accordance with the tariff rate determined by the number inputted to the telephone station apparatus;

means responsive to said rate select outputs for generating a predetermined one of a plurality of repetitive basic call time period signals in accordance with said rate select signal, said basic call time period signal generating means including means for inhibiting the timing of a basic call time period and the output of a basic call time period signal in response to a timing inhibit signal;

means for muting the audio path of the telephone receiver and transmitter of the telephone station apparatus in response to an audio mute control signal; and selectively programmable initial rate control means responsive to said coin credit pulse generating means for generating said timing inhibit signal and said audio mute control signal until said coin credit pulse generating means has generated a predetermined number of coin credit pulses indicating that an initial rate has been deposited corresponding to a predetermined number of basic coin denomination units, said initial rate being selectively programmed into said selectively programmable initial rate means at a selection input.

8. Telephone paystation apparatus for connection to central office apparatus over telephone line connections, said paystation comprising:

coin depositing and collection means for controlling the collection of coins deposited into said telephone station apparatus;

means responsive to said coin depositing and collection control means for generating coin credit pulses in accordance with the number of coins and denominations of coins deposited;

means responsive to said coin credit pulse generating means and a basic call time period signal for maintaining a purchased call time credit as coins are deposited in terms of a number of basic coin denomination units, said purchased call time credit being incremented by the basic coin denomination units of deposited coins and as coins are deposited at any time during a telephone call and decremented by one basic coin denomination unit upon each occurrence of said basic call time period signal, said coin depositing and collection controlling means being operative to collect all deposited coins during a telephone call after the called party has answered in accordance with an answer signal from the central office apparatus;

means responsive to the telephone number inputted to the station apparatus by a station apparatus user and to an identification number of the telephone station apparatus for generating a rate select signal on one of a plurality of rate select outputs in accordance with the tariff rate determined by the number inputted to the telephone station apparatus; and selectively programmable means responsive to said rate select outputs for generating a predetermined one of a plurality of repetitive basic call time period signals in accordance with said rate select signal, said selectively programmable means including means for generating a plurality of basic call time period outputs, selective means responsive to a predetermined number of said basic call time period outputs and said rate select outputs and associating each of said rate select outputs with one of said predetermined number of basic call time period outputs according to a predetermined relationship for outputting a predetermined one of said basic call time period outputs as a basic call time period signal corresponding to the basic call time period associated with said rate select output having said rate select signal, and programmable means for determining said predetermined relationship between said predetermined number of basic call time period outputs and said rate select outputs, said programmable determining means including selective connection means for connecting said predetermined number of basic call time period outputs to said selective outputting means.

* * * * *

UNITED STATES PATENT AND TRADEMARK OFFICE
CERTIFICATE OF CORRECTION

PATENT NO. : 4,198,545
DATED : April 15, 1980
INVENTOR(S) : MELVAL C. HAIST and ALAN J. LISCHIN It is certified that error appears in the above-identified patent and that said Letters Patent are hereby corrected as shown below:

Column 21, claim 7, line 56, after "comprising" insert the following:

--coin depositing and collection means for controlling the collection of coins deposited into said telephone station apparatus;--

Signed and Sealed this

Twenty-first Day of October 1980

[SEAL]

Attest:

SIDNEY A. DIAMOND

Attesting Officer

Commissioner of Patents and Trademarks